United States Patent [19]

Shaw

[11] Patent Number: 4,583,373
[45] Date of Patent: Apr. 22, 1986

[54] CONSTANT EVAPORATOR PRESSURE SLIDE VALVE MODULATOR FOR SCREW COMPRESSOR REFRIGERATION SYSTEM

[75] Inventor: David N. Shaw, Unionville, Conn.

[73] Assignee: Dunham-Bush, Inc., West Hartford, Conn.

[21] Appl. No.: 654,911

[22] Filed: Sep. 27, 1984

Related U.S. Application Data

[63] Continuation-in-part of Ser. No. 580,047, Feb. 14, 1984, Pat. No. 4,495,778.

[51] Int. Cl.$^4$ ............................................. F25B 41/00
[52] U.S. Cl. ................................. 62/196.3; 62/228.3; 62/209; 417/310
[58] Field of Search ........................ 62/209, 217, 196.3, 62/228.5, 228.3; 417/278, 310, 292

[56] References Cited

U.S. PATENT DOCUMENTS

2,581,329 1/1952 Newton .......................... 62/228.5 X
2,715,992 8/1955 Wilson ............................. 62/196 X
4,335,582 6/1982 Shaw et al. ...................... 417/310 X

*Primary Examiner*—William E. Wayner
*Attorney, Agent, or Firm*—Sughrue, Mion, Zinn, Macpeak, and Seas

[57] ABSTRACT

A space conditioning closed loop refrigeration system, particularly a vehicle air conditioning system utilizing a positive displacement compressor having a slide valve for varying the capacity and shiftable between full load and full unload positions and vice versa and driven therebetween by a linear fluid motor having a movable member coupled to the slide valve and forming a first chamber which is normally dumped via a slide valve modulator to compressor suction pressure and a second chamber open to compressor discharge pressure. A restricted passage between chambers tends to cause the first chamber to reach compressor discharge pressure absent that chamber dumping to suction. The slide valve modulator selectively activates the venting of the first chamber to compressor suction pressure in response to fall of suction pressure below a predetermined value to prevent a serious reduction in evaporator temperature caused by either a reduction in load on the evaporator, an increase in speed of the compressor, or both. A temperature unloader in the form of a normally closed valve is connected within a bypass passage by passing the slide valve modulator to insure dumping of the first chamber to suction in response to a predetermined drop in temperature of the space to be conditioned, irrespective of the level of compressor suction pressure.

9 Claims, 17 Drawing Figures

CONSTANT EVAPORATOR PRESSURE SLIDE VALVE MODULATOR FOR SCREW COMPRESSOR REFRIGERATION SYSTEM

This application is a continuation-in-part of application Ser. No. 580,047 filed Feb. 14, 1984, entitled "TEMPERATURE PRESSURE ACTUATED CAPACITY CONTROLLING SYSTEM FOR TRANSPORTATION AIR CONDITIONING SYSTEM", now U.S. Pat. No. 4,495,778 issued Jan. 29, 1985.

FIELD OF THE INVENTION

This invention relates to a compressor type refrigeration system utilizing a slide valve as a capacity control element, and more particularly, to a control system for maintaining constant system evaporator pressure irrespective of system parameters. The invention is particularly applicable to air conditioning systems in motor vehicles, and will be described in that context, but it should be appreciated that the control system could be employed in other, static refrigeration and air conditioning systems.

Helical screw compressors utilizing slide valves to vary the compressor capacity have been employed in bus air conditioning systems where the compressor is progressively unloaded as the engine RPM increases in an attempt to optimize the capacity/power curve.

In a typical operating cycle for a combined heating-/air conditioning system, two different thermostats are used to set the upper and lower set point temperatures. When the return air temperature is below the lower set point temperature (e.g. 68 degrees F.), the heating system is activated and the blower operated at a lower speed. When the temperature rises above the lower set point temperature, the heating system is activated but the blower continues to operate for venting operation. If the return air temperature rises above the upper set point temperature (e.g. 72 degrees F.), the air conditioning system is activated with the compressor operating at full load and the blower operating at a high speed. If the temperature falls below the upper set point temperature, the air conditioning system continues to operate at full capacity, but the heating system is also activated to reheat the air after it passes the evaporator. This simultaneous operation of the air conditioning and heating systems is for the purpose of obtaining a desired degree of dehumidification and avoidance of clutch cycling. In a typical bus air conditioning system, the compressor is cyclically clutch connected to the continuously operating vehicle internal combustion engine whose speed varies. When the temperature falls below the lower set point temperature, the air conditioning system is disabled, and the heating system is enabled. However, once the compressor has been activated, it is unlikely that it will shut off since the heating capacity exceeds the cooling capacity.

A problem with the typical system described above is that, without the reheating mode of operation, an excessive amount of "off" time may elapse between the time at which the compressor is disengaged when the temperature falls below 68 degrees F. and the time at which the compressor is re-engaged when the temperature rises above the upper set point temperature of 72 degrees F. During this off cycle, the evaporator coil tends to warm up significantly, and no further moisture removal is obtained. In fact, the moisture which has collected on the evaporator coil may be re-evaporated. Further, the on/off cycling of the compressor results in excessive amount of wear and tear on the compressor clutch.

With reheating, on the other hand, the system operates at designed capacity at all times with the heating system adding enough heat to keep the temperature above the lower set point. Excessive energy is wasted in having the compressor remove not only the normal heat build-up in the bus, but also that added by the heating system.

U.S. Pat. No. 4,388,048, assigned to the assignee of the present application, discloses an improved variable capacity compressor. Application Ser. No. 421,121 filed Sept. 22, 1982, entitled "AIR CONDITIONING AND COMPRESSOR CONTROL SYSTEM", also assigned to the common corporate assignee, discloses a control system for a helical screw compressor in which the compressor is operated at 33%, 66% or 100% load, depending on the monitored temperature of the return air. The capacity dictated by the return air temperature passing over the evaporator coil may be increased or decreased in accordance with the other sensed parameters such as relative humidity, evaporator coil temperature, etc.

While the compressor and control systems described in the above patents represent a significant improvement in air conditioning systems, "re-heat"-type heating/air conditioning systems still operate in a manner such that the air conditioning compressor continues to operate at full load while the heating system is simultaneously operated as the return air temperature decreases from the upper set point temperature to the lower set point temperature.

In an effort to overcome these problems, the applicant has heretofore devised a more effective system for obtaining desired humidification at temperatures between the upper and lower set points and to obtain such dehumidification while decreasing the energy consumption of the system and minimizing the strain on the compressor clutch in U.S. application Ser. No. 580,047. That application discloses a control system enabling a heating system at temperatures below the lower set point with a possible venting operation employed when the temperature rises above the lower set point. In such system, when the temperature rises above the set point, the compressor is permitted to load up to 100%, and the loading of the compressor is varied as the evaporator pressure or suction pressure rises and falls. When the temperature falls below the upper set point, the compressor is automatically unloaded to a 33% load level regardless of the evaporator pressure, and the heating system is not activated until the temperature falls below the lower set point. The system uses a cooling thermostat and a heating thermostat which respectively determine the upper set point and the lower set point which close at temperatures above their respective set points. With the set point temperatures at 72 degrees F. and 68 degrees F., respectively, when the heating thermostat opens below 68 degrees F., the heating system is on, and when the cooling thermostat is closed above 72 degrees F., the cooling system is on. In the temperature band between the upper and lower set points, the cooling system may or may not be on, with the cooling system being activated only when the temperature rises above the upper set point and being deactivated only when the temperature falls below the lower set point. The system utilizes a compressor load relay which is energized when the cooling thermostat is closed above 72 degrees F. to thereby load control circuitry which will allow adjustment of the loading of the compressor, e.g. between 33%, 66% and 100% in accordance with the evaporator pressure. In this system, when the return air temperature falls below 72 degrees F., the cooling thermostate opens and the compressor load relay is de-energized, thereby fixing the compressor at 33% load regardless of the evaporator pressure.

The present invention is directed to an improvement in air conditioning and refrigeration system in general, and in bus air conditioning systems in particular, utilizing the content of the my prior U.S. Pat. No. 4,388,048 and application Ser. Nos. 421,121 and 580,047; and the disclosures of that patent and said application are incorporated herein by reference.

As may be appreciated, in such vehicle air conditioning systems where the compressor speed is directly proportional to the vehicle engine speed, the obvious tendency is to have too much compressor capacity at high engine speed, if the compressor is sized in order to deliver sufficient capacity at low engine speed.

An object of the present invention, therefore, is to provide an engine driven compressor type air conditioning or refrigeration system which maintains a constant evaporator pressure regardless of engine speed, thereby maintaining system capacity at a constant level at any vehicle speed.

It is a further object of the present invention to provide an improved air conditioning or refrigeration system, particularly a vehicle air conditioning system utilizing a helical screw rotary compressor having a variably positioned slide valve for controlling compressor capacity, wherein the compressor is subjected to a further reduction in capacity dictated by the internal space temperature of the vehicle being conditioned.

SUMMARY OF THE INVENTION

The present invention is directed in part to a climate control system for controlling the temperature of air in a controlled area which may be a refrigeration system of an air conditioning system with the system including a compressor operable over a varying load level. The system is capable of at least a cooling mode where the compressor is activated to reduce the air temperature. A temperature sensor senses and monitors the air temperature, and means responsive to the air temperature is employed to turn on and off the compressor. Further sensing means sense at least one operating parameter of the climate control system other than the air temperature. The climate control system includes an evaporator coupled to the compressor and over which the air is passed to remove heat from the air while evaporating a working fluid. The further sensing means comprises means for sensing the suction pressure of the working fluid returned from the evaporator to the compressor, and the system includes means responsive thereto for maintaining constant the pressure of the working fluid at the evaporator. Further, the control system comprises means responsive to the temperature sensing means for monitoring the air temperature for overriding the further sensing means and for effecting full unload operation of the compressor irrespective of the compressor suction pressure.

The invention has application to any space conditioning closed loop refrigeration system including a positive displacement compressor, a condenser and evaporator with conduit means carrying a condensible refrigerant working fluid and connecting the compressor, condenser and evaporator in a series closed loop and wherein the conduit means includes expansion means upstream of the evaporator. The compressor includes a shiftable slide valve for movement between a first position to effect full unloading of the compressor and a second position to effect full loading of the compressor, and vice versa. A fluid motor operatively coupled to the slide valve comprises a movable member which may be a piston and a cylinder or other means defining with the movable member a first sealed chamber remote from the slide valve and a second sealed chamber proximate to the slide valve on respective sides of the movable member. Preferably, the end of the slide valve remote from the piston is subjected to compression suction pressure, and the end of the slide valve proximate to the piston is subjected to compressor discharge pressure, and wherein the effective surface area of the piston is in excess of that of the slide valve, whereby with equal pressures within the first and second chambers, the slide valve is automatically shifted to compressor full load position during compressor operation.

The improvement resides in restricted passage means connecting said first chamber to said second chamber such that the first chamber tends to be at discharge pressure with zero pressure differential across the piston or movable member. Further, means are provided for normally venting the first chamber to compressor suction pressure, thereby overriding the restricted passage means, and means for selectively activating the venting of the first chamber to compressor suction pressure in response to fall of compressor suction pressure below a predetermined value, thereby preventing a serious reduction in evaporator temperature caused by either a reduction in load on the evaporator, an increase in speed of the compressor, or both.

The invention has particular application where the refrigeration system constitutes a vehicle air conditioning system. The compressor is engine driven at varying speeds, and wherein the means for selectively venting the first chamber to suction functions to maintain constant evaporator pressure regardless of engine speed, thereby maintaining system capacity at a constant level at any vehicle speed.

The means for selectively venting said first chamber comprises a slide valve modulator, the slide valve modulator including a valve body, a first passage within the valve body open to compressor suction pressure, a second passage within the valve body open to the first chamber and intersecting the first passage. A displaceable valve member is provided within one of the valve body passages for controlling fluid communication between the valve body passages with means responsive to suction pressure for shifting the movable valve member from open to closed position, and vice versa, and adjustable biasing means normally biasing the valve member to open position, thereby venting the first chamber to compressor suction. The slide valve modulator may comprise a constant pressure diaphragm type valve with the first passage being axially in line with the diaphragm and comprising a bore with the movable valve member comprising a cylindrical plunger axially slidable within the bore. The second passage intersects the bore at right angles thereto, and the first passage further comprises a first counterbore proximate to the compressor suction connection and carrying a first preset coil spring engaging the plunger for presetting the plunger to valve closed position. A valve seat may be formed within the first passage bore and engageable by the plunger to close off fluid communication between the first and second passages. The first passage may further comprise a second counterbore to the opposite side of the bore from first counterbore and housing a cylindrical block. The plunger is coaxially fixed to the block and movable therewith, and a diaphragm overlies the block. A small diameter passage connects the counterbores of the first passage to apply suction pressure to one face of the diaphragm. A second coil spring operatively engages the diaphragm on the opposite side of the diaphragm to the block and has a spring constant in excess of that of the first coil spring, thereby normally shifting the plunger to valve open position against the bias of the first coil spring. Preferably, mechanical means are provided for variably adjusting the compression of the second coil spring to preset the level of constant compressor suction pressure required to seat the normally open slide valve modulator plunger.

BRIEF DESCRIPTION OF THE DRAWINGS

FIG. 4a is a longitudinal, sectional view of the slide valve modulator of FIG. 1, with the compressor operating under the conditions as shown in FIG. 2a.

FIG. 5a is an enlarged sectional view of a portion of the slide valve modulator of FIG. 4a, with the valve plunger in full open position under conditions of compressor operation, as illustrated in FIG. 2a.

DESCRIPTION OF THE PREFERRED EMBODIMENTS

Figure 1:
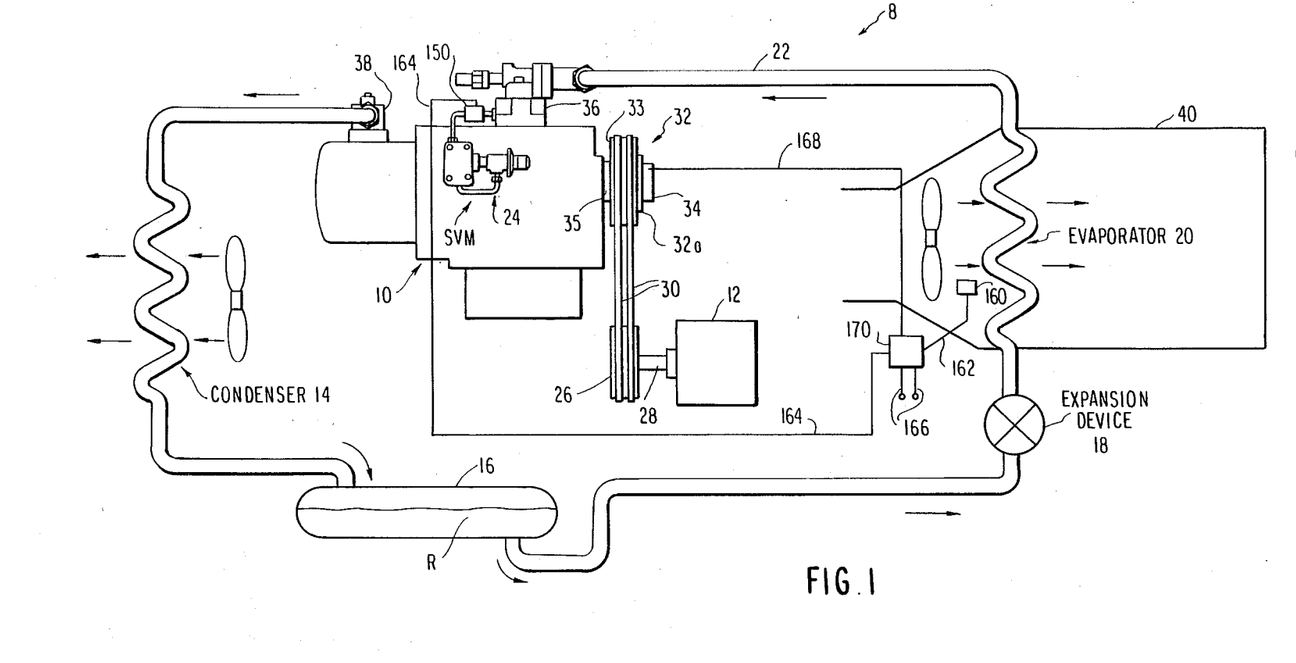
FIG. 1 is a schematic diagram of a vehicle engine driven helical screw rotary compressor air conditioning system utilizing the constant evaporator pressure slide valve modulator control system forming a preferred embodiment of the present invention.

By reference to FIG. 1, there is seen a typical bus air conditioning system utilizing a helical screw rotary compressor having slide valve capacity control and incorporating the constant evaporator pressure control system of the present invention with the system components in solid line and with an optional temperature unloader illustrated in dotted lines and evidencing a further embodiment of the invention.

The closed loop air conditioning system indicated generally at 8, includes a helical screw rotary compressor, indicated generally at 10. The compressor 10 is driven by a vehicle engine 12, and the components of the system 8 comprise essentially, in addition to compressor 10, a condenser 14, a liquid receiver 16, an expansion device 18, and an evaporator 20, all connected to a series closed refrigeration loop 22 by conduit means 22. The receiver 16 carries a supply of liquid refrigerant R which is circulated through the system, discharging as a high pressure gas from the compressor 10, condensing into liquid form at the condenser 14 and accumulating within the receiver 16. The liquid refrigerant expands to a lower pressure through the expansion device 18 within evaporator 20 prior to returning as a low pressure suction gas to compressor 10. In that regard, a discharge valve 38 controls the flow of high pressure refrigerant vapor from the compressor at the discharge side through the condenser 14, while the suction valve 36 controls the return of suction vapor to the suction or low side of the helical screw rotary compressor 10.

As a key element to the control system of the present invention, there is provided a new modulating device, i.e. a constant evaporator pressure slide valve modulator, indicated generally at 24 (hereinafter referred to as SVM). As mentioned previously, the illustrated system constitutes a bus type air conditioning system in which the bus or vehicle includes a vehicle space to be conditioned, indicated at 40 and schematically being downstream of and in the return air flow passing over evaporator 20. In the schematic representation of FIG. 1, the vehicle engine 12 is not in line with the helical screw rotary compressor 10. In the illustrated embodiment, the engine 12 is laterally offset. Projecting from the engine 12 is a shaft 28, and mounted to the end of that shaft 28 is a pully 26 corresponding to a similar component 33 of the variable speed drive pully, indicated generally at 32, mounted to compressor rotor shaft 35, exterior of the compressor casing. A series of endless belts 30 connect drive pully 26 to driven pulley 33. The variable speed drive pulley 32 includes element 32a constituting an electro-magnetic operated clutch face under control of mechanism 34 for effecting a variable speed clutch drive to the compressor 10. Such use of a variable speed drive pulley 32 is conventional in mechanically coupling a compressor to a vehicle engine such as engine 12 for bus air conditioning systems.

As will be appreciated hereinafter, in an alternative embodiment of the invention, an optional temperature unloader indicated generally at 150, is connected between the slide valve modulator 24 and the suction side of the compressor, via suction valve 36.

Referring next to FIGS. 2a, 3a, 4a, and 5a, the components of the bus air conditioning system 8 are principally concerned with the control system for modulating compressor operation to prevent the air conditioning system evaporator temperature from dropping too far in a transport vehicle or in a more general sense to prevent a serious reduction in evaporator temperature caused by reduction in load on the evaporator for a constant speed compressor or as the result of increase in speed of the compressor in a variable speed compressor drive system. Those system components involve a linear motor for longitudinally shifting the capacity control slide valve on the compressor 10, between full unload and full load positions, or an interim position therebetween, and a slide valve modulator coupled thereto and controlling conditions within one of the chambers of that linear motor.

Figure 2A:
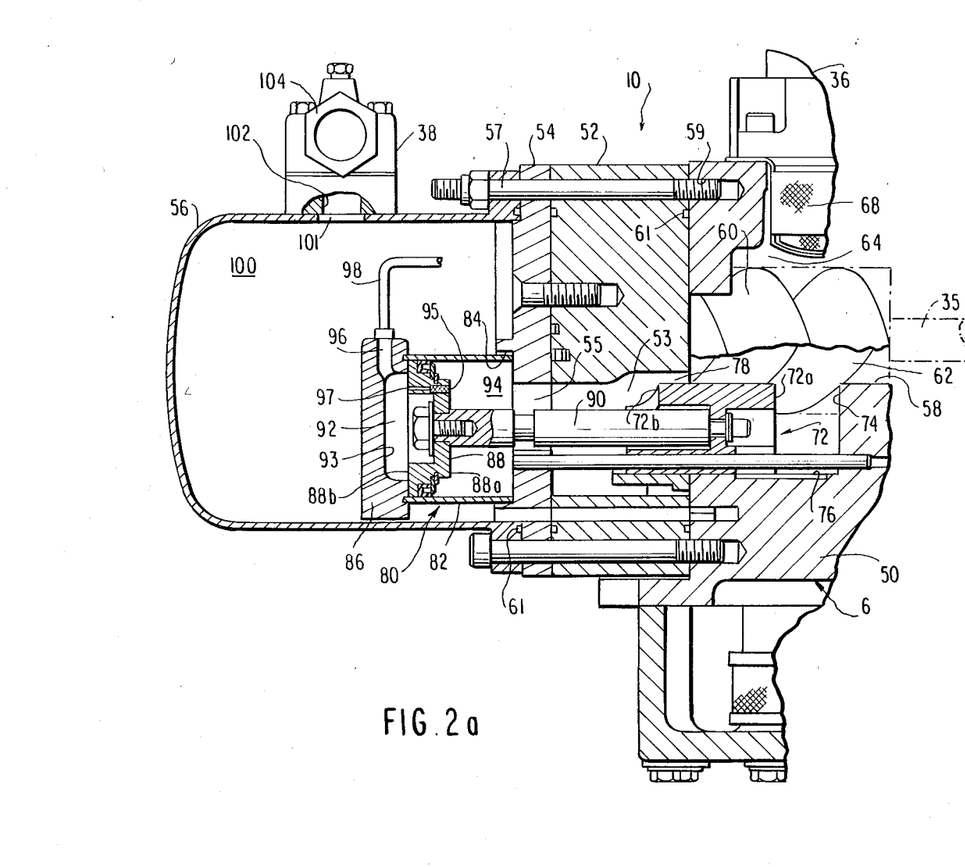
FIG. 2a is a vertical, sectional view of a portion of the helical screw rotary compressor of FIG. 1, showing the reciprocating slide valve and the linear motor for effecting shifting of the slide valve to vary the capacity of the compressor, with the slide valve at compressor full unload position.

Specifically, in FIG. 2a, the compressor 10 includes a compressor housing, indicated generally at 6. A portion of the compressor housing 6 comprises a central compressor housing section 50 having parallel side by side cylindrical bores, one of which is shown at 58 and which houses female rotor 60. A male rotor 62, housed in the other bore, is in mesh with the female rotor and these helical screw rotors function to effect compression of the refrigerant working fluid R which is introduced to the compression process through a compressor suction port 64.

Suction valve 36 is connected to conduit means 22 at the downstream end of evaporator 20. A filter 68 is shown as mounted within the passage leading to suction port 64 from the suction valve 36 to remove any contaminants within the refrigerant vapor R returned to the low pressure side of the compressor 10. The rotors 60, 62 are mounted for rotation about their axes. In the embodiment shown, the female rotor 60 drives the male rotor 62 and drive is effected by a rotor shaft 35 integral with the female rotor and projecting out of the compressor housing 6. Shaft 35 terminates at the variable speed drive pulley 32. The compressed vapor leaves the compression process via a compressor discharge port 78. In that respect, the end of housing section 50 is closed off by a housing end plate 52. End plate 52 includes a relatively large passage 53 through which the discharge gas flows away from the compression process. Within the housing section 50, there is provided an elongated recess 76 which opens to the bores bearing intermeshed helical screw rotors and within which recess is slidably mounted a slide valve 72 in conventional fashion. The slide valve 72 includes a right hand end face 72a which abuts a shoulder 74, defined by recess 76 forming an area which is normally open to suction pressure with the slide valve 72 shifted to the left somewhat, as in the position of FIG. 2a. A cover plate 54 is mounted to the face of end plate 52 opposite that of compressor housing section 50, and a cup-shaped cover 56 is mounted to the cover plate 52, all being achieved by a series of screws as at 57 which are threaded to tapped holes 59 within compressor housing section 50. Appropriate seals are provided at 61 to prevent high pressure gas loss at the interface of these components for compressor 10.

The slide valve 72 is driven by a fluid linear motor, indicated generally at 80, and comprised of a cylinder 82 having one end mounted within an annular recess 84 of cover plate 54. The opposite end of cylinder 82 is closed off by cylinder head 86. A piston 88 is mounted for reciprocation within cylinder 82, being fixed to one end of shaft 90 and the opposite end of shaft 90 is rigidly coupled to the slide valve 72 such that the slide valve 72 is shiftable from left to right and vice versa depending upon the pressure differential between opposite end faces 88a and 88b of piston 88. Cylinder head 86 is recessed at 93 to assist in forming a first chamber 92 between end face 88b of the piston 88 and the cylinder head 86. To the opposite side of piston 88, a second chamber 94 is defined by the cylinder 82 and the piston 88, which chamber 94 is continuously open to the discharge port 78 of the compressor and is therefore at compressor discharge pressure whenever the compressor is operating. A passage 55 is provided within end plate 54 communicating with passage 53 to insure that pressurization of chamber 94. Chamber 92 is connected via conduit or tubing 98 and a passage 96 within head 86, to the slide valve modulator 24. As may be appreciated, the compressor discharge gas flows not only into chamber 94 to the right of piston 88 within cylinder 82, but also to the interior of cover 56, such that the cover chamber 100 is at compressor discharge pressure. The compressor discharge then passes through and under the control of discharge valve 38 via passage 102 within that member, opening to the interior 100 of cover 56, via hole 101. Fitting 104 connects to conduit 22 to achieve that connection.

Further, a particular aspect of the present invention lies in the restricted communication between the chamber 92 to the left of piston 88 and chamber 94 to the right of piston 88 and within cylinder 82. A small diameter orifice or passage 97 leads from chamber 92 directly through piston 88 to chamber 94, and positioned within that passage is a strainer or filter 95. As may be appreciated, a restricted connection may be made other than directly through piston 88, as for instance via a conduit or tube leading from recess 93, exterior of cylinder 82 to the opposite end of the cylinder, as for instance within the cover plate 54, but opening to hole or passage 55. As may be further appreciated, absent compressor capacity control, there is a tendency for the pressures to equalize on the front and rear of piston 88 such that chamber 92 seeks compressor discharge pressure of chamber 94.

Figure 4A:
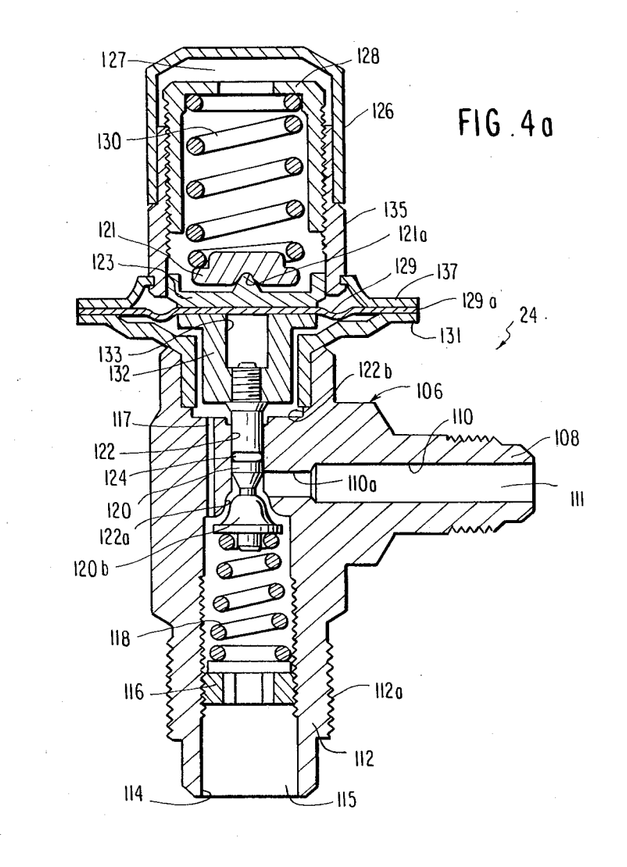
Figure 4B:
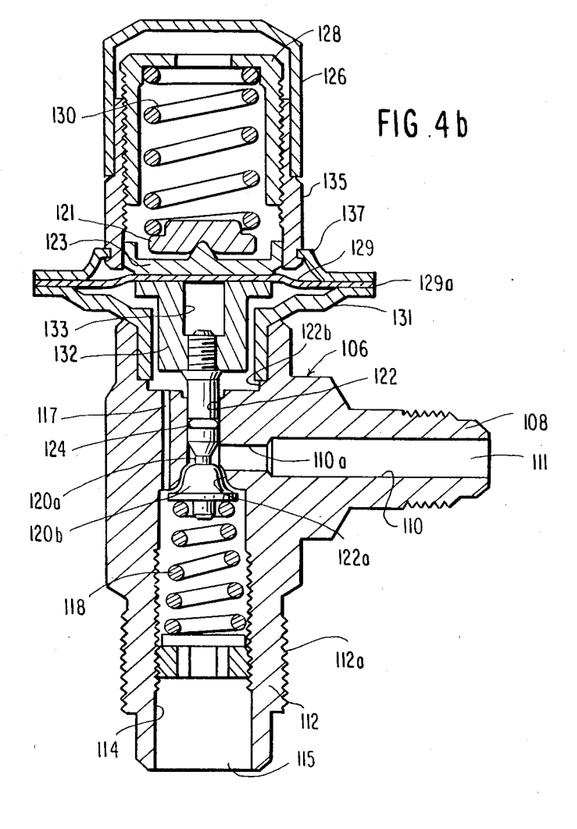
FIG. 4b is a sectional view of the slide valve modulator of FIG. 4a, with components at positions corresponding to compressor operation as illustrated in FIG. 2b.
Figure 4D:
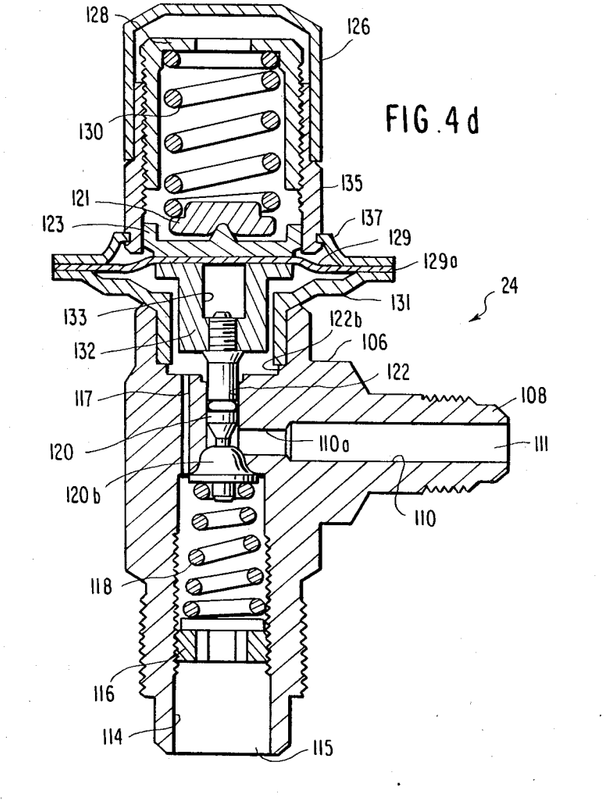
FIG. 4d is a further sectional view of the slide valve modulator of FIG. 4a, under compressor full unload conditions.

Turning next to FIG. 4a, the slide valve modulator 24 is seen to constitute a spring biased diaphragm type, constant pressure valve for selectively controlling fluid communication between a first passage 111 within section 108 of a valve body 106 and a second right angle passage 115 within valve body section 112. In the illustrated embodiments, the slide valve modulator 24, while used in a somewhat different manner, constitute a constant pressure valve of commercial manufacture by Parker Hannifin Corporation of Winterport, Fla., Model A-1 or A-2. Such constant pressure valves are commercially exploited by a number of companies. The Singer Corporation of Schiller Park, Ill., produces a similar valve under Model No. 104F or 204C, which could be employed in lieu thereof. The slide valve modulator housing 106, which may be of cast metal, is principally provided with bore 122. The lower end 112 of valve body 106 carries a counterbore 114 and having a dome shaped enlargement or valve seat 122a at the interface of bore 122 and counterbore 114. Above the counterbore 114 and opening to bore 122 is bore 110a, which is of reduced diameter to counterbore 110 forming the other fluid passage 111 component of the first valve body 106. Above bore 122, there is provided a further counterbore 122b, within which is positioned a cylindrical block 132. The block 132 is provided with an axial hold 133 which is tapped such that a valve plunger 120 is fixedly threaded to the block 132 at one end. Plunger 120 is of a diameter so as to slide freely within bore 122. The plunger 120 is provided with a necked portion 120a as best seen in the enlarged FIG. 5a, terminating in a bell-shaped portion 120b matching configuration and size to valve seat 122a against which the plunger portion 120b seats when the valve plunger 120 is in full closed position. An O-ring seal 124 is preferably mounted to the plunger 120 and engages the bore 122 so as to effectively directly seal off bore 110a and counterbore 110 from counterbore 122b bearing block 138. A portion of the counterbore 114 of valve body 106 is tapped, and threadably mounted to that portion is a hollow spring support member 116 which functions to locate a preload compression spring 118 witin counterbore 114 such that the upper end of spring 118 abuts the lower end of plunger 120, thereby providing a resilient mount for centering the lower end of the plunger relative to valve seat 122a.

The upper end of block 132 abuts a diaphragm 129 whose outer peripheral edge 129a is sealably sandwiched between cup-shaped member 131 and ring 137. The diaphragm 129 may be a metal diaphragm, and components 131, 129a and 137 may be all welded together at their peripheries to effect a seal and to mount the diaphragm in position across the upper end of the block 132. The inner edge of ring 137 flares away from the diaphragm 129 and functions to support a cylindrical support member 135 which is threaded on its inner periphery. Member 135 threadably carries an axially adjustable adjusting cap 128. Mounted internally of the adjusting cap 128, is a compression coil spring 130 whose upper end abuts the cap 128 and whose lower end rests on a circular plate 121. The plate 121 is provided, centrally on its bottom, with a notch at 121a, so as to ride on a saddle 123 which rests on the upper face of diaphragm 129. A dust cap 126 fits onto the exterior of cylindrical support member 135, at its upper end, and function to prevent contaminates from entering the spring/diaphragm chamber 127 defined by those members.

Figure 5A:
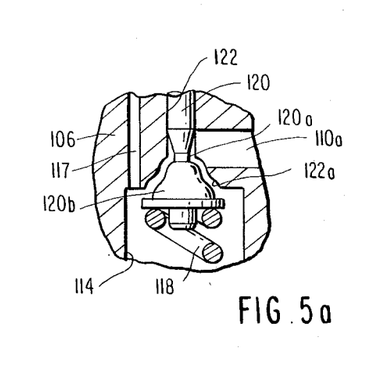
Figure 5B:
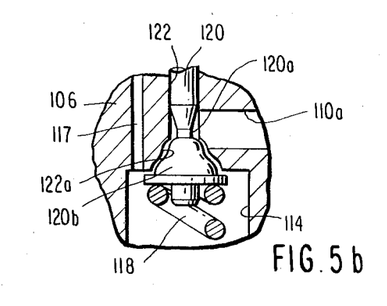
FIG. 5b is a sectional view of a portion of the slide valve modulator corresponding to that of FIG. 5a, showing the partially open condition of the valve plunger, corresponding to that of FIG. 4b.
Figure 5D:
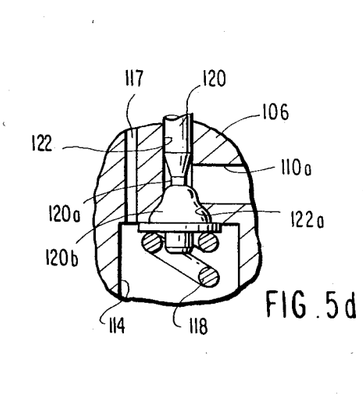
FIG. 5d is an enlarged sectional view of a portion of the slide valve modulator under compressor full unload conditions with the valve closed and with the vehicle temperature unloader in valve open condition.

The spring constant of spring 130 is in excess of that preload spring 118, so that a net spring force is exerted against the diaphragm 129 by tightening down the adjusting cap 128 sufficient to normally move the valve plunger 120 into full open position, as evidenced in FIGS. 4a and 5a, particularly under conditions where the compressor is fully unloaded, and correlated to FIG. 2a. Within valve body 106, there is a vertical small diameter passage 117 which extends from counterbore 114 to counterbore 122b, so as to continuously subject the bottom of diaphragm 129 to suction pressure, since counterbore 114 is open to suction, at suction valve 36.

Figure 3A:
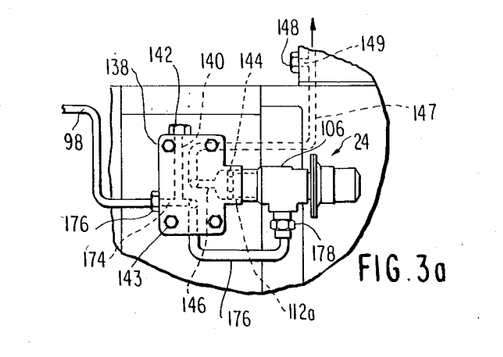
FIG. 3a is an enlarged side elevational view of the slide valve modulator mounted to the compressor within the system of FIG. 1, under conditions where the compressor is fully unloaded.
Figure 3B:
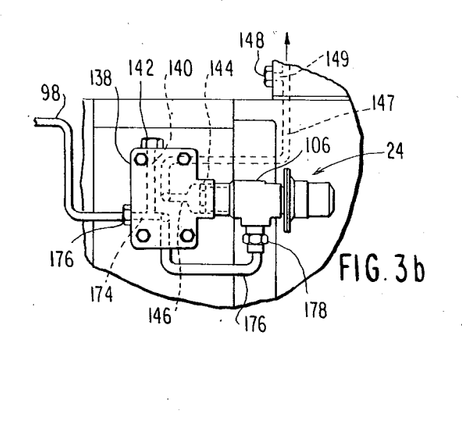
FIG. 3b is a sectional view of the slide valve modulator of FIG. 3a under conditions corresponding to that of the compressor operation, as illustrated in FIG. 2b.
Figures 3C, 4C, 5C:
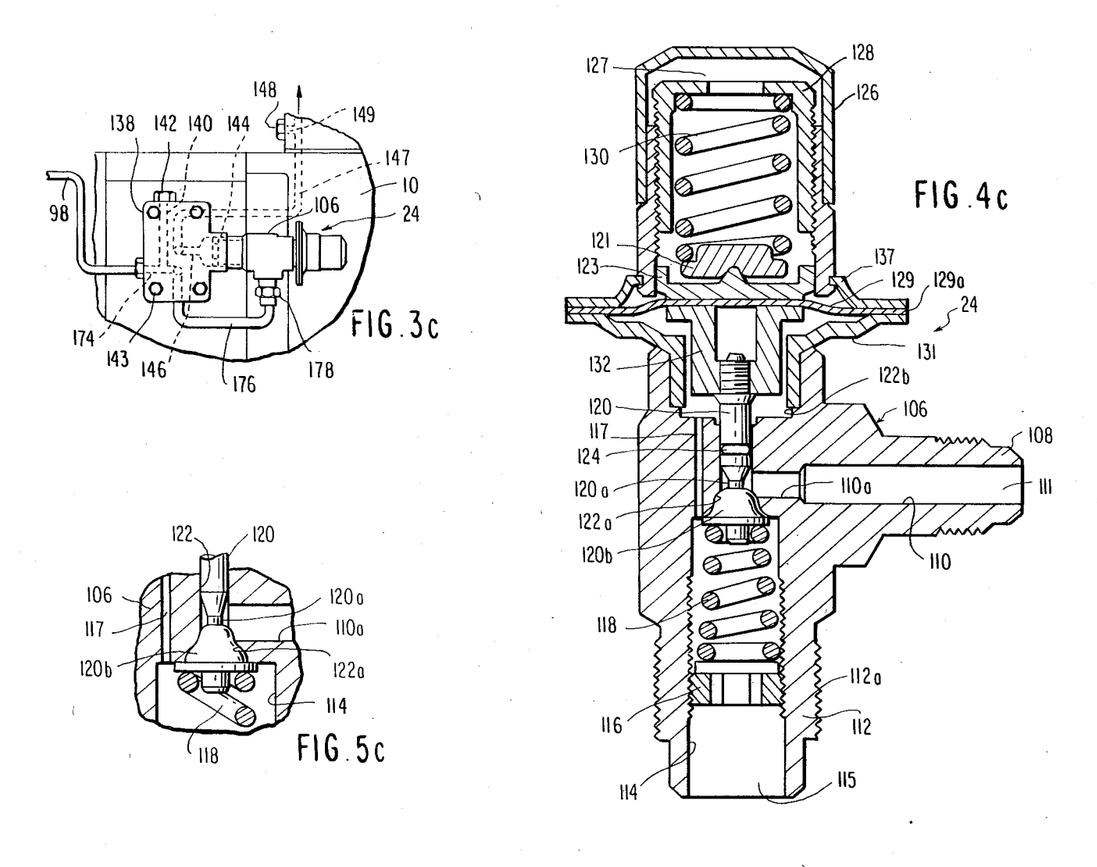
FIG. 3c is a further view of the slide valve modulator of FIG. 3a, under conditions corresponding to compressor full load.
FIG. 4c is a similar sectional view of the slide valve modulator to that of FIG. 4a, with the components at positions corresponding to compressor full load conditions.
FIG. 5c is an enlarged sectional view of a portion of the slide valve modulator showing the valve plunger in full closed position.
Figure 3D:
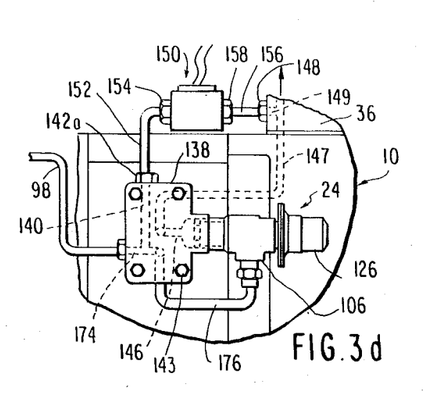
FIG. 3d is a further view of the slide valve modulator of FIG. 3a, with a vehicle temperature unloader as mounted to the side of the compressor of FIG. 1, under compressor full unload conditions.

In that respect, the connection of the slide valve modulator SVM 24 may be best appreciated by reference to FIG. 3a which is an enlargement of the showing in FIG. 1. Body 106 of the SVM valve 24 is physically mounted to the side of the compressor 10 by being physically screwed into the side of a manifold block 138, which block, in turn, is mounted to the side of the compressor housing via bolts 143. The control system major components are integrated to the compressor 10 itself. A fluid passage 174 internally of block 138 is coupled via fitting 176 to conduit or tube 98 leading to chamber 92, to the left of the linear fluid motor piston 88. That passage 174 splits, with one portion in communication via pipe or tube 176, external of block 132, to counterbore 110 within the SVM valve body 106, the connection being effected by fitting 178, FIG. 3a.

Figure 2B:
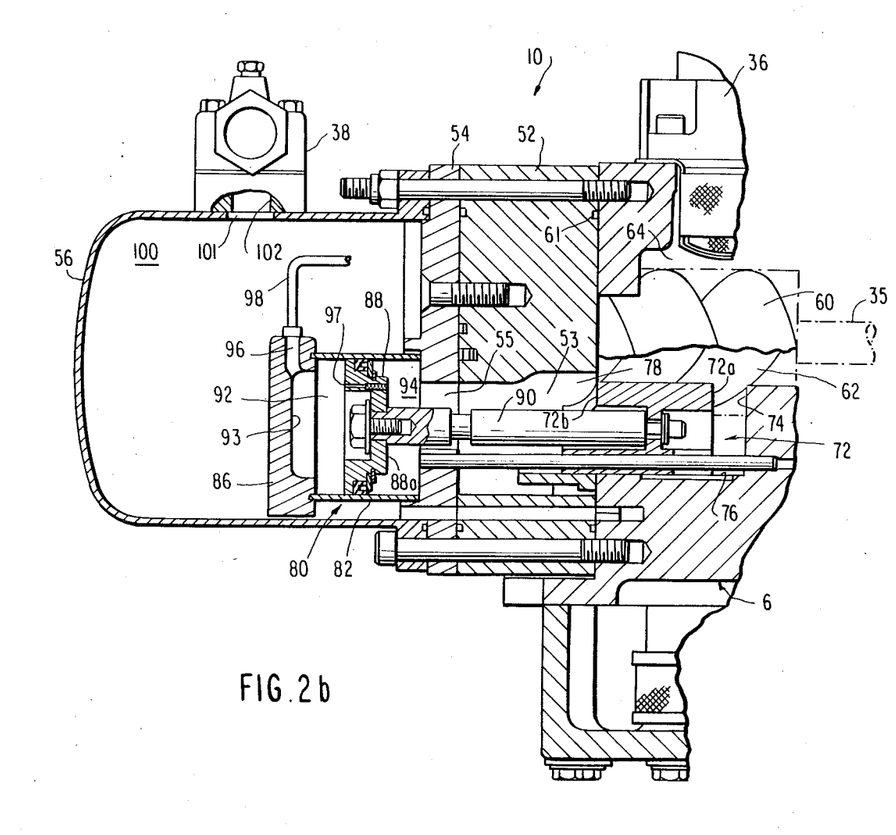
FIG. 2b is a similar sectional view of a portion of the compressor of FIG. 2a, with the compressor operating under partial unload.
Figure 2C:
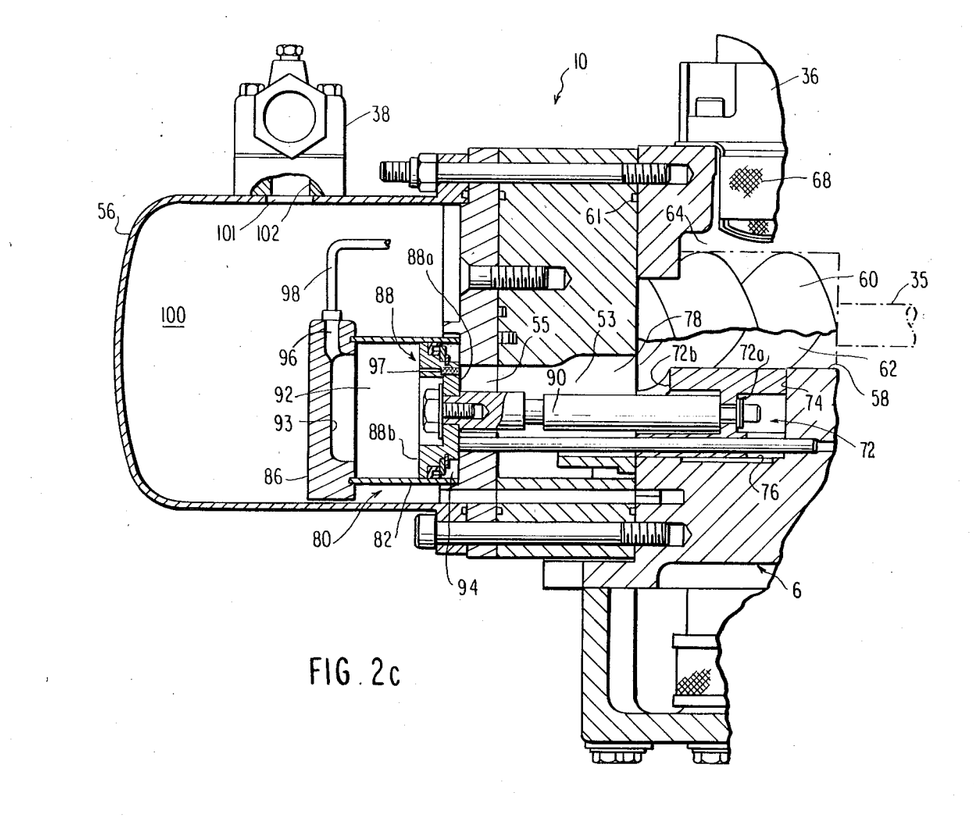
FIG. 2c is a further sectional view of the portion of the helical screw rotary compressor shown in FIG. 2a, under compressor full load conditions.
Figure 2D:
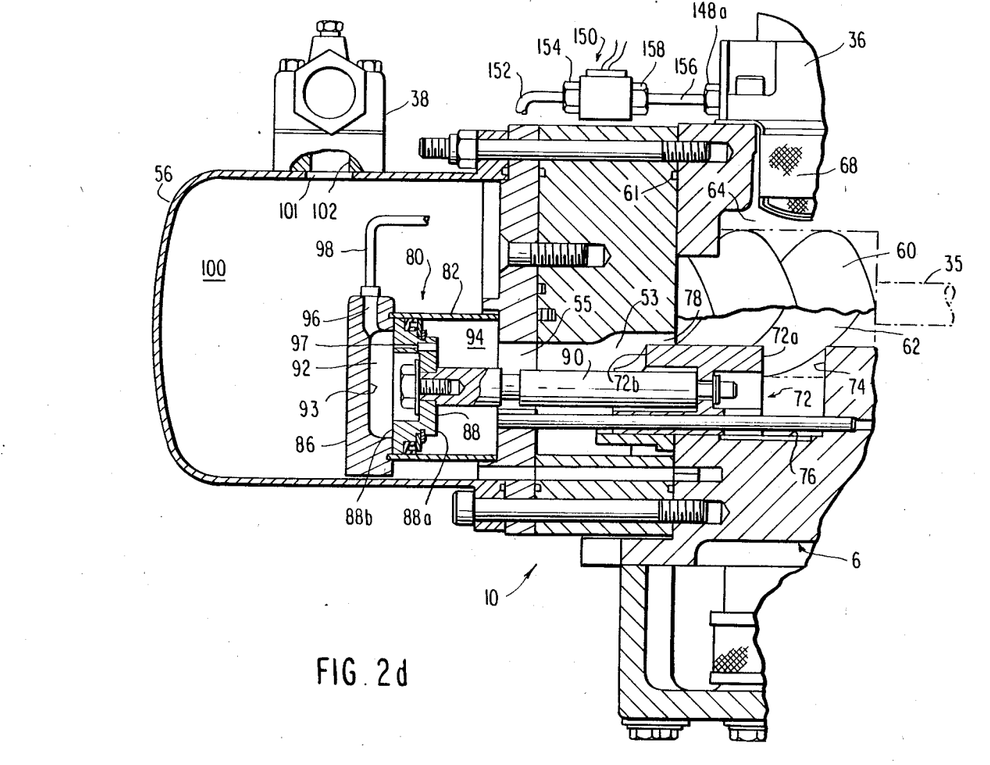
FIG. 2d is a further sectional view of a portion of the compressor of FIG. 2a under fully unloaded conditions utilizing a vehicle temperature unloader and partially forming yet another embodiment of the present invention.

As mentioned previously, the manifold block 138 is provided with a large diameter bore or passage 144 which is tapped so as to receive the threaded peripheral portion 112a of the valve body section 112 in fluidtight engagement. As such, the counterbore 114 of the SVM opens to a passage 146 within the manifold block 138 and via a further conduit or tube 147 is open directly via suction valve 38 to compressor suction pressure. Passage 140, branching from passage 174, within the manifold block leads to the end of the block and is closed off by plug 142 in the embodiment of FIGS. 2a-2c inclusive. Also, a tap is made at 149 to passage 147 within the suction valve 36 which tap 149 is closed off by plug 148 in that embodiment. However, both of these passages will be employed in the alternate embodiment of FIGS. 2d, 3d, 4d and 5d and in the manner illustrated in dotted lines involving the optional temperature unloader 150, FIG. 1.

Insofar as the first embodiment of the present invention is concerned, however, by reference initially to FIGS. 2a, 3a, 4a and 5a, it may be seen that, first of all, the compressor slide valve 72 is in the full unloaded position, i.e. the compressor 10 is operating at minimum flow rate/capacity. This position is maintained via the following sequence of events. First, low suction pressure at compressor suction port 64 operates via counterbore 114, small diameter passage 117, and counterbore 122b on the lower face of SVM diaphragm 129. The low suction pressure permits the biasing force of spring 130 to deflect the center of diaphragm 129 downwardly with the diaphragm 129 pressing in direct contact against the upper face of block 132 to drive valve plunger 120 downwardly to unseat the valve plunger relative to valve seat 122a, FIG. 5a. This opens a substantial path from left side chamber 92 of the linear motor 80 to compressor suction.

As may be appreciated, the compressor discharge pressure at discharge port 78 acts upon the right side or face 88a of piston 88 with chamber 94 placed at discharge pressure, while also acting on the left end 72b of the slide valve 72. Since the slide valve 72 has approximately one-half of the effective area of piston 88 and with the right end of the slide valve 72 always exposed to suction pressure at recess 76, if the pressure in linear motor chamber 92 acting on piston 88 is only slightly above the suction pressure due to the fact that the valve plunger 120 of the SVM is open, the piston 88 will move from right to left. This fully unloads the compressor 10 since piston 88 is directly connected mechanically to the slide valve 72 by piston rod 90.

The effect of the small orifice 97 and strainer 95 permits chamber 92 to be pressurized over time at compressor discharge pressure such that the pressures across the piston 88 are equalized absent the slide valve modulator opening. It is seen that SVM 24 must have sufficient effective flow area in order that the pressure in chamber 92 can be dropped sufficiently low in order that enough force can be developed to cause the piston 88 to move the slide valve 72. Under the condition shown in FIGS. 2a, 3a, 4a and 5a, the suction pressure is low with the suction pressure being relatively low at its return from the evaporator and the compressor 10 will operate fully unloaded.

In order to adjust the suction pressure which the slide valve modulator (SVM) will maintain by controlling the position of the slide valve 72, the adjusting cap 28 needs only be rotated in its threaded engagement with cylinder member 135 to vary the compression of coil spring 130. As a result, any desired suction pressure can be preset with the system components. As may be appreciated, the presence of the dust cap 126 prevents the diaphragm 129 from being exposed to normal atmospheric pressure, as in the illustrated embodiment. However, it should be noted that the upper side of the diaphragm 129 can be exposed to a vacuum condition with a sealed chamber. This would render the design insensitive to any variations of barometric pressure which in mountainous terrains can be some cause for concern where the invention is employed as illustrated in a vehicle air conditioning system. It is desirable to maintain a constant evaporating pressure, regardless of changes of barometric pressure. However, the normal changes in barometric pressure are not considered as significant within a transit bus application, as they have been considered in high volume, low cost production automotive applications. In these automotive applications, various means are employed to maintain constant evaporator pressure utilizing a vacuum reference in order that an absolute minimum of evaporating surface be employed in the vehicle without any danger of actual freezing.

The control is effected essentially by the slide valve modulator and the conditions shown in FIGS. 2b, 3b, 4b and 5b illustrate the situation where the compressor slide valve is at intermediate load position and the compressor is under partial load. This position is fully determined by the SVM as follows. If the compressor speed starts to fall or the return air temperature to the evaporator starts to rise, that is, the air entering the duct leading to the evaporator 20 prior to passing over the evaporator and into the vehicle space to be conditioned 40, FIG. 1, the vapor pressure of the refrigerant leaving the evaporator and open to the suction port 64 of compressor 10 will tend to rise in either case. Diaphragm 129 of SVM 24 senses this rising evaporator pressure and starts to close down the escape area from chamber 92 past valve plunger 120 and seat 122a via tube 98 leading to manifold block 138 and tube 136 to the slide valve modulator counterbore 110 and thence to suction via counterbore 114. This is accomplished by reference to the sectional view, FIG. 4b, and its enlargement at FIG. 5b, where it can be seen that the plunger 120 is now closer to its seat 122a as dictated by the new position of diaphragm 129. This causes the pressure in chamber 92 to rise because chamber 92 is constantly being fed with a small flow of vapor at compressor discharge pressure from chamber 94 through the small diameter orifice 97 directly through piston 88 to chamber 92. The rise in chamber 92 pressure causes the piston 88 to shift from left to right which, in turn, causes the slide valve 72 to move to the right, thus increasing the effective pumping rate of the compressor helical screw rotors 60, 62. The increase in pumping rate of the compressor draws more vapor from the system evaporator 20, thus tending to maintain the evaporator pressure at a level dictated by the setting of the slide valve modulator 24. In this manner, it can be easily appreciated that a slight rise in suction pressure will increase the pressure in chamber 92, thus tending to load the compressor, thus maintaining constant evaporating temperature. It can also be appreciated that a slight reduction in pressure will tend to reduce the pressure in chamber 92, thus tending to unload the compressor by causing the slide valve linear motor piston 88 to move towards the left because of the increasing pressure differential between the two chambers 92, 94, thus, also tending to maintain constant evaporating temperature.

SVM 24, therefore, tends to maintain a constant evaporating temperature through the entire range of slide valve strokes built into the compressor initially.

FIGS. 2c, 3c, 4c, and 5c show the compressor and the control components under conditions where the compressor slide valve is at full load or maximum capacity position. In these figures, it may be seen that the pressure in chamber 92 to the left of piston 88 is relatively high, thus causing piston 88 to shift to its full right position within cylinder 82 of the linear fluid motor 80. As the suction pressure rises at suction port 64 to the point where the fluid pressure exerted via small diameter passage 117 within valve body 106 of the SVM 24, is sufficient to cause the diaphragm 129 to move upwardly to the extent of allowing the valve plunger 120 to close fully on valve seat 122a under the force of preload spring 118 and cut off fluid communication from bore 110a and counterbore 114 of that valve body, the pressure in chamber 92 of the fluid motor 80 will actually reach compressor discharge pressure. Since chamber 92 is cut off from suction and is open to the chamber 94 on the opposite side of piston 88, via the small orifice 97, it becomes subject to full discharge pressure. Now, discharge pressure exists on both sides of piston 88. Therefore, there is no piston force applied to slide valve 72. However, the slide valve 72 is exposed to the discharge pressure on its left face or end 72b and is subject to suction pressure on its right end 72a. The slide valve 72 is now held secure in its fully loaded position by the force created by this pressure differential (as piston 88 is balanced with like discharge forces acting on the full surface area of that piston).

At very low engine speeds, the suction pressure will rise above the pressure which will fully close the slide valve modulator plunger 120. This is because the compressor 10 is typically sized so as to deliver rated capacity at a speed somewhat lower than the lowest idle speed allowed on the vehicle. However, a typical transit application allows such an variation in compressor speed, that the compressor 10 has double the required pumping rate when at maximum engine speed (if the compressor has no unloading provision). This condition causes evaporator freeze up as the evaporator pressure will tend to drop very low at high engine speeds if no means whatsoever are employed to modulate the compressor and/or air conditioning or refrigeration system employing the same.

Referring partially to FIG. 1 and more particularly to FIGS. 2d, 3d, 4d and 5d, a second embodiment of the present invention utilizes an additional element in the control system which is considered highly desirable by many in transit vehicle air conditioning systems and has particular application thereto. Under milder weather, moderate passenger loading conditions, the compressor 10 (even with the slide valve modulator 24) may deliver more capacity than is needed to properly cool the vehicle. One means with dealing with this excess capacity is to shut the compressor 10 off when the vehicle gets too cold and then to turn it on again when it gets warm. This is referred to as a cycling clutch system, discussed previously, and is not desired at all by the transit industry. However, the current practice in the transit industry is to employ cycling clutch systems to a great degree as other effective means of controlling capacity are not available at this time. The cycling clutch system is proving to be a horrendous problem to the transit vehicle air conditioning business. In smaller size automotive systems, it is proven reasonable.

Therefore, it is further desirable to greatly reduce compressor capacity, once the bus passenger compartment, i.e. space 40 to be cooled is cooled and to reduce the compressor capacity without shutting the compressor off (or de-clutching). The second embodiment of the invention system of the invention employs a vehicle temperature unloader, indicated generally at 150, which constitutes a normally closed solenoid valve as a means of accomplishing this. The vehicle temperature unloader 150 is connected, at fitting 154, into the control system via a tube 52 and via a fitting 142a which replaces the plug 142 on the manifold block 138 and thus solenoid valve 150 makes fluid connection on one side to passage 140 within the manifold block leading to passage 174. The opposite side of the solenoid valve 150 is connected via fitting 158 and a tube or conduit 156 to the tap 149, at fitting 143a, which leads to passage 147 and to the suction side of the compressor at suction port 64. This constitutes a bypass about the slide valve modulator 24 to directly connect the left side chamber 92 of the linear motor 80 to suction and to insure that the slide valve of the compressor moves to full unload position as a result of energization of the solenoid valve forming the vehicle temperature unloader 150.

Referring again to FIG. 1, in addition to the optional temperature unloader 150, there is provided a temperature sensor at 160 which supplies an electrical signal responsive to the temperature of the return air prior to passage over evaporator 20 to control panel 170. A control signal is sent to the solenoid valve or vehicle temperature unloader 150 via electrical leads 164 from a control panel 170, FIG. 1. The control panel 170 is under control of the signal emanating from the electrical line 162 leading from the temperature sensor and the control panel is connected to a source of electrical power (not shown) via leads 166 leading to that control panel. Thus, the solenoid valve 150, which is normally closed, opens when energized to bypass the slide valve modulator 24. When the vehicle internal temperature becomes sufficiently cool, the temperature sensor or thermostat 160 actuates, which, in turn, causes the solenoid valve or temperature unloader 150 to open. The effective area through the solenoid valve 150 is equivalent to the effective area through the SVM when it is exposed to low suction pressure. Therefore, the pressure in chamber 92 is held low when the vehicle is cool regardless of engine speed. This means that the evaporator pressure/temperature in low to moderate engine speeds is allowed to rise significantly above the setting of the slide valve modulator 24. Since system capacity is a direct function of the difference between the vehicle internal return air temperature and the evaporating temperature, it is obvious that the capacity will be sufficiently reduced if the evaporating temperature is allowed to rise and approach the return air temperature. The predetermined stroke of the slide valve 72 controls the magnitude of this capacity reduction. Therefore, it is obvious that the simple solenoid valve 150, i.e. vehicle temperature unloader can avoid much compressor clutch cycling. However, to add, it is also desirable to keep the system evaporator 20 relatively cool in order to prevent re-evaporation of water vapor into the air stream which would occur if the compressor 10 is shut off and the evaporating temperature is allowed to rise as dictated by return air temperature.

Thus, the utilization of the vehicle temperature unloader 150 serves to allow a sufficient degree of relative humidity control on the transit vehicle utilizing the system.

Additionally, temperature sensor 160 functions, depending on return air temperatures to conditioned space 40 to effect on/off control of compressor 10 by having control panel 170 send a control signal to clutch operator 34 of the variable speed drive pulley 32. When the temperature within space 40 reaches a predetermined high temperature, demanding cooling, clutch operator 34 receives a signal via line 168, FIG. 1, from control panel 170 connecting compressor 10 to engine 12 and initiating drive to helical screw rotors 60, 62.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a closed loop refrigeration system for conditioning a space, said system comprising a positive displacement compressor, a condenser, and an evaporator, conduit means carrying a condensible refrigerant working fluid and connecting said compressor, condenser and evaporator in closed loop series and including expansion means upstream of said evaporator, said compressor including a shiftable slide valve for movement between a first position to effect full unloading of the compressor and a second position to effect full loading of the compressor, and vice versa, a fluid motor for shifting said slide valve between said first and second positions, said fluid motor comprising a movable member operatively coupled to said slide valve, means defining with said movable member a first sealed chamber remote from said slide valve and a second sealed chamber proximate to said slide valve on respective sides of said movable member, means for subjecting said second chamber to compressor discharge pressure; the improvement comprising:

restricted passage means connecting said first chamber to said second chamber such that said first chamber tends to be at discharge pressure with zero pressure differential across said movable member, means normally venting said first chamber to compressor suction pressure, thereby overriding said restricted passage means, and means for selectively activating the venting of said first chamber to compressor suction pressure in response to fall of suction pressure below a predetermined value, thereby preventing a serious reduction in evaporator temperature caused by either a reduction in load on the evaporator, an increase in speed of the compressor or both.

2. The refrigeration system as claimed in claim 1, wherein said refrigeration system constitutes a vehicle air conditioning system, said compressor is engine driven, and wherein said means for selectively venting said first chamber to compressor suction pressure functions to maintain constant evaporator pressure regardless of engine speed, thereby maintaining system capacity at a constant level at any vehicle speed.

3. The refrigeration system as claimed in claim 1, wherein; said fluid motor comprises a cylinder, a piston mounted within said cylinder for reciprocation therein constituting said movable member, and said compressor further comprises means for subjecting the end of the slide valve remote from said piston to compressor suction pressure, means for subjecting the end of the slide valve proximate to said piston to compressor discharge pressure, and wherein the effective surface area of the piston is in excess to that of the slide valve; whereby, with equal pressures within said first and second chambers, said slide valve is automatically shifted to compressor full load position during compressor operation, and wherein said means for selectively venting said first chamber comprises a slide valve modulator, said slide valve modulator including; a valve body, a first passage within said valve body open to compressor suction pressure, a second passage within said valve body open to said first chamber and intersecting said first passage, a displaceable valve member within one of said valve body passages for controlling fluid communication between said valve body passages, means responsive to suction pressure for shifting said movable valve member from open to closed position and vice versa, and adjustable biasing means for normally biasing said valve member to open position, thereby venting said first chamber to compressor suction.

4. The refrigeration system as claimed in claim 2, wherein said means for selectively venting said first chamber comprises a slide valve modulator, said modulator comprises a valve body, a first passage within said slide valve body open to compressor suction pressure, a second passage within said valve body open to said first chamber and intersecting said first passage, a displaceable valve member within one of said valve body passages for controlling fluid communication between said valve body passages, means responsive to suction pressure for shifting said movable valve member from open to closed position and vice versa, and adjustable biasing means for normally biasing said valve member to open position, thereby venting said first chamber to compressor suction.

5. The refrigeration system as claimed in claim 3, wherein said slide valve modulator comprises a constant pressure diaphragm valve, said first passage is axially in line with said diaphragm and comprises a bore, said movable valve member comprises a cylindrical plunger axially slidable within said bore, said second passage intersects said bore at right angles thereto, said first passage further comprises a first counterbore proximate to the compressor suction connection and carrying a first preset coil spring engaging said plunger for presetting said plunger to valve closed position, a valve seat formed within said first passage and engaging said plunger to close off fluid communication between said first and second passages, said first passage further comprising a second counterbore to the opposite side of said first counterbore and slidably housing a cylindrical block, said plunger being coaxially fixed to said block and movable therewith, a diaphragm overlying said block, a small diameter passage within said valve body connecting said counterbores of said first passage to apply suction pressure to said diaphragm, a second coil spring operatively engaging said diaphragm on the opposite side of said diaphragm to said block and having a spring constant in excess of that of said first coil spring for shifting said plunger to valve open position against the bias of said first coil spring, and means for variably adjusting the compression of said second coil spring to preset the level of constant compressor suction pressure required to seat said normally open slide valve modulator plunger.

6. The refrigeration system as claimed in claim 1, further comprising means for measuring the temperature of the conditioning space, temperature unloader passage means connecting said first sealed chamber to compressor suction bypassing said means for selectively terminating the venting of the first chamber to compressor suction pressure, a temperature unloader within said temperature unloader passage means, said temperature unloader comprising a normally closed valve, and means connecting said temperature sensing means for said conditioning space and said temperature unloader normally closed valve and responsive to a predetermined temperature drop within said conditioning space for opening said normally closed valve irrespective of the level of compressor suction pressure.

7. The refrigeration system as claimed in claim 5, wherein a manifold back carries said slide valve modulator, said manifold block including first a passage for facilitating connection of said first slide valve modulator body passage to compressor suction, a second manifold block passage facilitating connection of said second slide valve modulator body passage to said first chamber, a bypass passage within said manifold block opening to said manifold block first passage and a temperature unloader connecting the suction side of the compressor and said bypass passage within said manifold block, said temperature unloader comprising a normally closed valve and means operatively connected to said temperature unloader and responsive to the temperature of the space to be conditioned for opening said temperature unloader normally closed valve to dump said first chamber to suction and to override said slide valve modulator in response to predetermined drop in temperature of the space to be conditioned, irrespective of the level of compressor suction pressure.

8. A climate control system for controlling the temperature of air in a controlled area, said system including a compressor operable over a varying load level, said system being capable of at least a cooling mode, wherein said compressor is activated to reduce said air temperature said control system comprising:
  temperature sensing means for monitoring said air temperature,
  further sensing means for sensing at least one operating parameter of said climate control system other than said air temperature,
  said climate control system including an evaporator coupled to said compressor and over which said air is passed to remove heat from said air while evaporating a working fluid,
  said further sensing means comprising means for sensing the compressor suction pressure of the working fluid returned from said evaporator to said compressor and said system further comprising means responsive to said means for sensing said compressor suction pressure for maintaining constant the pressure of said working fluid at said evaporator, means responsive to said air temperature sensing means for overriding said further sensing means and for effecting full unload operation of said compressor, irrespective of the compressor suction pressure, and means responsive to said air temperature for turning on and off said compressor.

9. A control system for controlling the temperature of air in a controlled area, said system including a compressor operable over a varying load level, said system being capable of at least a cooling mode, wherein said compressor is activated to reduce said air temperature said control system comprising:

temperature sensing means for monitoring said air temperature, further sensing means for sensing at least one operating parameter of said climate control system other than said air temperature, said climate control system including an evaporator coupled to said compressor and over which said air is passed to remove heat from said air while evaporating a working fluid, said further sensing means comprising means for sensing the compressor suction pressure of the working fluid returned from said evaporator to said compressor and said system further comprising means responsive to said means for sensing said compressor suction pressure for maintaining constant the pressure of said working fluid at said evaporator, and means responsive to said temperature sensing means for monitoring said air temperature for overriding said further sensing means and for effecting full unload operation of said compressor, irrespective of the compressor suction pressure.

* * * * *